United States Patent [19]
Stewart

[11] Patent Number: 6,029,393
[45] Date of Patent: Feb. 29, 2000

[54] RODENT TRAPPING DEVICE

[76] Inventor: Ronald J. Stewart, R.D. 1, Marion Center, Pa. 15759

[21] Appl. No.: 09/092,134

[22] Filed: Jun. 5, 1998

[51] Int. Cl.[7] ................................................. A01M 23/16
[52] U.S. Cl. ........................................ 43/63; 43/60; 43/58
[58] Field of Search ................................. 43/58, 60–63; 220/23.4

[56] References Cited

U.S. PATENT DOCUMENTS

| | | | |
|---|---|---|---|
| 24,771 | 7/1859 | Wetmore | 43/61 |
| 472,687 | 4/1892 | Winkler | 43/61 |
| 623,875 | 4/1899 | Brandon | 43/61 |
| 723,100 | 3/1903 | White . | |
| 829,960 | 9/1906 | Mackel | 43/64 |
| 909,797 | 1/1909 | Hicks . | |
| 1,011,207 | 12/1911 | Kemp . | |
| 1,093,880 | 4/1914 | Palmowski . | |
| 1,222,406 | 4/1917 | Jakab . | |
| 1,243,008 | 10/1917 | Taylor | 43/61 |
| 1,277,122 | 8/1918 | Renner . | |
| 1,293,894 | 2/1919 | Ollier | 43/61 |
| 1,339,135 | 5/1920 | Richards | 43/61 |
| 1,399,518 | 12/1921 | Quaritius | 43/58 |
| 1,453,352 | 5/1923 | Heckman . | |
| 1,453,795 | 5/1923 | Hovell | 43/61 |
| 1,554,079 | 9/1925 | Frick | 43/61 |
| 1,648,160 | 11/1927 | Boedecker . | |
| 1,713,167 | 5/1929 | Bushman | 43/61 |
| 1,857,932 | 5/1932 | Basso | 43/61 |
| 2,574,780 | 11/1951 | Giacoletto | 43/61 |
| 2,663,116 | 12/1953 | Jones . | |
| 2,682,726 | 7/1954 | Gustin | 43/61 |
| 2,754,618 | 7/1956 | Denabursky . | |
| 2,774,175 | 12/1956 | Maddocks . | |
| 2,803,918 | 8/1957 | Hall . | |
| 3,478,722 | 11/1969 | Falcone et al. | 220/23.4 |
| 3,624,951 | 12/1971 | Gilbaugh | 43/61 |
| 3,762,093 | 10/1973 | Rohde . | |
| 3,823,504 | 7/1974 | Dosch . | |
| 3,975,857 | 8/1976 | Branson et al. | 43/61 |
| 4,031,653 | 6/1977 | Jordan | 43/61 |

(List continued on next page.)

FOREIGN PATENT DOCUMENTS

| | | | |
|---|---|---|---|
| 753571 | 7/1956 | United Kingdom | 43/61 |
| 1 382 822 | 2/1975 | United Kingdom . | |

*Primary Examiner*—Michael J. Carone
*Assistant Examiner*—Darren W. Ark
*Attorney, Agent, or Firm*—Banner & Witcoff, Ltd.

[57] ABSTRACT

A rodent trap comprised of two members movable relative to one another such that the enclosure has an open position for permitting access into the interior of the enclosure by a rodent and a closed position for retaining the rodent. The relative movement is imposed by a biasing device, selectively positionable for rendering the trap operable in a rodent suffocating mode for killing an entrapped rodent or in a non-suffocating mode for releasing the entrapped rodent. Movement is activated by a biased triggering device which detects the pressure of the rodent. The rodent traps include locking members permitting two or more traps to be selectively and removably engageable with each other in a side-to-side configuration, a back-to-back configuration, or a combination thereof.

11 Claims, 4 Drawing Sheets

U.S. PATENT DOCUMENTS

| | | |
|---|---|---|
| 4,144,667 | 3/1979 | Souza . |
| 4,161,079 | 7/1979 | Hill ............................................. 43/58 |
| 4,231,180 | 11/1980 | Bare . |
| 4,232,472 | 11/1980 | Muelling . |
| 4,238,902 | 12/1980 | Holl et al. ................................... 43/61 |
| 4,291,486 | 9/1981 | Lindley . |
| 4,379,374 | 4/1983 | Lindley . |
| 4,393,616 | 7/1983 | Kaufman et al. . |
| 4,418,493 | 12/1983 | Jordan . |
| 4,450,648 | 5/1984 | Pratscher ..................................... 43/64 |
| 4,462,182 | 7/1984 | French ......................................... 43/85 |
| 4,557,066 | 12/1985 | Godwin, Jr. . |
| 4,557,067 | 12/1985 | Ha . |
| 4,590,703 | 5/1986 | Cutter . |
| 4,596,087 | 6/1986 | Pratscher ..................................... 43/64 |
| 4,763,439 | 8/1988 | Smith . |
| 4,770,292 | 9/1988 | Handler ................................... 220/23.4 |
| 4,787,170 | 11/1988 | Kingsbury et al. . |
| 4,829,700 | 5/1989 | Ha . |
| 4,884,713 | 12/1989 | Handler ................................... 220/23.4 |
| 4,949,499 | 8/1990 | Lindros, Jr. ................................... 43/61 |
| 4,979,327 | 12/1990 | Harris . |
| 5,005,312 | 4/1991 | Lutes . |
| 5,007,540 | 4/1991 | Beasely et al. .......................... 206/581 |
| 5,050,755 | 9/1991 | Strawder ................................ 220/23.4 |
| 5,062,557 | 11/1991 | Mahvi et al. .......................... 220/23.4 |
| 5,115,916 | 5/1992 | Beasley et al. ......................... 206/581 |
| 5,123,200 | 6/1992 | Vance . |
| 5,175,957 | 1/1993 | West . |
| 5,183,278 | 2/1993 | Wade, Jr. ................................ 220/23.4 |
| 5,199,589 | 4/1993 | Noble ..................................... 220/23.4 |
| 5,263,576 | 11/1993 | Boreen et al. ......................... 220/23.4 |
| 5,310,071 | 5/1994 | Rivlin et al. ........................... 220/23.4 |
| 5,327,673 | 7/1994 | Paglia . |
| 5,367,820 | 11/1994 | Lafforthun . |
| 5,381,916 | 1/1995 | Strawder ................................ 220/23.4 |
| 5,447,249 | 9/1995 | Vickers .................................. 220/23.4 |
| 5,503,288 | 4/1996 | Conconi ................................. 220/23.4 |
| 5,638,974 | 6/1997 | Mann ..................................... 220/23.4 |
| 5,687,895 | 11/1997 | Allison et al. ......................... 220/23.4 |
| 5,810,187 | 9/1998 | Woodring ............................... 220/23.4 |
| 5,810,192 | 9/1998 | Cruz ....................................... 220/23.4 |
| 5,868,246 | 2/1999 | Westfall et al. ........................ 220/23.4 |

RODENT TRAPPING DEVICE

BACKGROUND OF THE INVENTION

This invention relates to a device for trapping rodents, e.g., mice. Mouse traps have existed for many years and have been used in an attempt to eliminate mice from residential and commercial properties. For as long as mouse traps have existed, people have recognized deficiencies in mouse traps, and have strived to create a better mouse trap.

When more than one mouse is suspected in a particular area, a person has the choice of using many individual mouse traps or a multi-catch mouse trap. Neither of these options may be desirable with existing mouse traps because the traps are typically set in difficult to access locations. A mouse trap must be carefully set and laid out for trapping the mouse. It must then be periodically inspected for trapped mice to avoid the odor of decomposition. This setting and inspection process may be time consuming for a plurality of individual traps because each is usually carefully set and positioned in usually tight and/or irregular spaces frequented by mice. Multi-catch traps may be undesirable or useless because they may be too large to fit into locations that are frequented by mice. Moreover, emptying multi-catch traps may be difficult and undesirable because of their size and the required effort to frequently empty them to avoid the accumulation of odor. A solution that permits mouse traps to be easily configured, positioned, set, and removed in difficult to access locations was thus needed.

Most rodent traps that do not crush the rodent are designed to work in one of three different manners: to entrap the rodent and suffocate it, to entrap the rodent where it is left to die by starvation, or to entrap the rodent temporarily where it can safely be released at another and less undesirable location. For example, U.S. Pat. Nos. 3,975,857; 4,557,066; 4,232,472; and 5,005,312 disclose traps having a movable member that forms an air tight seal around an opening into an enclosure for suffocating an entrapped rodent by hypercapnia—a process whereby the available oxygen in the enclosure is replaced by the rodent's own carbon dioxide. However, this trap only functions in a suffocating mode and cannot effectively be operated to catch a rodent to be released at another location. Traps of this type will be undesirable to those users who feel that killing mice is inhumane, and prefer to release the entrapped rodent at another location.

Traps that are not air tight and do not have an effective way to release the entrapped rodent kill the entrapped rodent by starvation. This is also undesirable as an even higher percentage of the population feel that these types of traps are inhumane because starvation is too cruel, even for rodents.

Many mouse traps are designed to entrap a rodent so that the user can transport the trap with the rodent to a remote location and free the rodent. However, these traps only function for trapping and later releasing the rodents. Many users do not wish to release the rodent and would prefer to have the rodent die quickly before handling the trap. An even less desirable alternative to not releasing the rodent is to have it slowly starve to death. Additionally, many rodent traps of this design do not have a safe and simple way to release the entrapped rodent.

U.S. Pat. No. 5,327,673 discloses a trap with an enclosure having holes in one of its walls. A piece of tape is used to cover the holes to make the inside of the enclosure substantially air tight to suffocate a rodent. The piece of tape can be removed to permit the rodent to survive until it is released. However, while removing the piece of tape provides the user the option of using the trap as a rodent removal device as opposed to a rodent suffocating device, it suffers drawbacks. For example, if the piece of tape is removed and the trap is successfully used a first time, the trap may be difficult to reuse, especially as a rodent suffocating device, because the piece of tape will likely have been discarded or be otherwise unusable. Also, this rodent trap fails to provide a safe and effective way to release an entrapped rodent. Therefore, a reusable rodent trap that gives the user the option of releasing the rodent or letting it die via suffocation was thus needed.

Mouse traps can also be undesirable because they are expensive and/or difficult to manufacture and assemble. Many rodent traps have elements that are pivotally connected to each other for relative movement to entrap the rodent. As rodent traps as frequently made from plastic to reduce manufacturing costs, these pivotal connections are commonly created by utilizing small rods or cylindrical projections on one element that fit within small holes in the other element. One example of this is shown in U.S. Pat. No. 4,829,700. However, rodent trap designs using small rods or cylindrical projections and small holes tend to be undesirable as they can be expensive and difficult to manufacture and assemble. Additionally, these designs have an increased likelihood of breakage during the assembly process. Therefore, a rodent trap that was inexpensive and simple to manufacture and assemble was needed.

SUMMARY OF THE INVENTION

In view of the foregoing, it is a principal object of the present invention to provide a rodent trap that overcomes the problems associated with the prior art.

It is an object of the present invention to provide a rodent trap that provides the owner the option of using the trap in a mode that kills entrapped rodents by suffocation, or in a mode that detains the rodent for later release. This gives the owner the ability decide to use the trap in a manner that he or she deems to be more humane and/or more efficient. The use of the trap in a suffocation mode makes the enclosure for entrapping the rodent air tight and reduces odor.

It is an object of the present invention to provide rodent traps with interlocking elements to form a larger rodent trapping device. This interlocking capability permits easy attachment and removal of one trap from an adjacent trap.

It is an object of the present invention to provide a rodent trap that is easy to manufacture and assemble, that does not utilize pivot rods and holes, and permits movable parts to be guided during their movement by fixed parts.

It is yet another object of the present invention to provide a rodent trapping device including an enclosure, a biasing device, and a triggering device. The enclosure has a first member and a second member, and an interior and an exterior. The second member is movable relative to the first member so that the enclosure can be in one of an open condition for permitting access into the interior of the enclosure by a rodent and a closed condition for retaining a rodent trapped within the interior of the enclosure. The enclosure includes at least one air hole located therein. The biasing device for biases the second member relative to the first member to urge the enclosure into its closed condition. Additionally, the biasing device is selectively positionable with respect to the enclosure between a first position placing the rodent trapping device in a rodent suffocating mode and a second position placing the rodent trapping device in a non-suffocating mode. The triggering device detects the presence of a rodent within the enclosure interior so that the enclosure is moved from its open condition to its closed condition in response to the detection of a rodent by the triggering device. The biasing device covers the air hole to suffocate an entrapped rodent when the enclosure is moved into its closed condition and said trapping device is in a rodent suffocating mode. The air hole is unobstructed by the biasing device to permit an entrapped rodent to breathe when the enclosure is moved into its closed condition and the trapping device is in a rodent non-suffocating mode.

It is also an object of the present invention to provide a first rodent trapping unit having a first locking member, and a second rodent trapping unit having a second locking member. The locking members are selectively and removably engageable with each other to provide a locking force between the locking members and resist the separation between the first and second rodent trapping units.

It is an object of the present invention to provide a device for trapping rodents including an enclosure, a biasing device, and a triggering device. The enclosure has first and second members, and an interior and an exterior. The second member is movable relative to the first member so that the enclosure can be in one of an open condition for permitting access into the interior of the enclosure by a rodent and a closed condition for retaining a rodent trapped within the interior of the enclosure. The biasing device biases the second member relative to the first member to urge the enclosure into its closed condition. The triggering device detects the presence of a rodent within the enclosure interior so that the enclosure is moved from its open condition to its closed condition in response to the detection of a rodent. The rodent trapping device also includes structure for selectively coupling the rodent trapping device to another rodent trapping device to resist the separation therebetween.

These and other objects and features of the invention will be apparent upon consideration of the following detailed description of preferred embodiments thereof, presented in connection with the following drawings in which like reference numerals identify like elements throughout.

DETAILED DESCRIPTION OF THE PREFERRED EMBODIMENT

Figure 1:
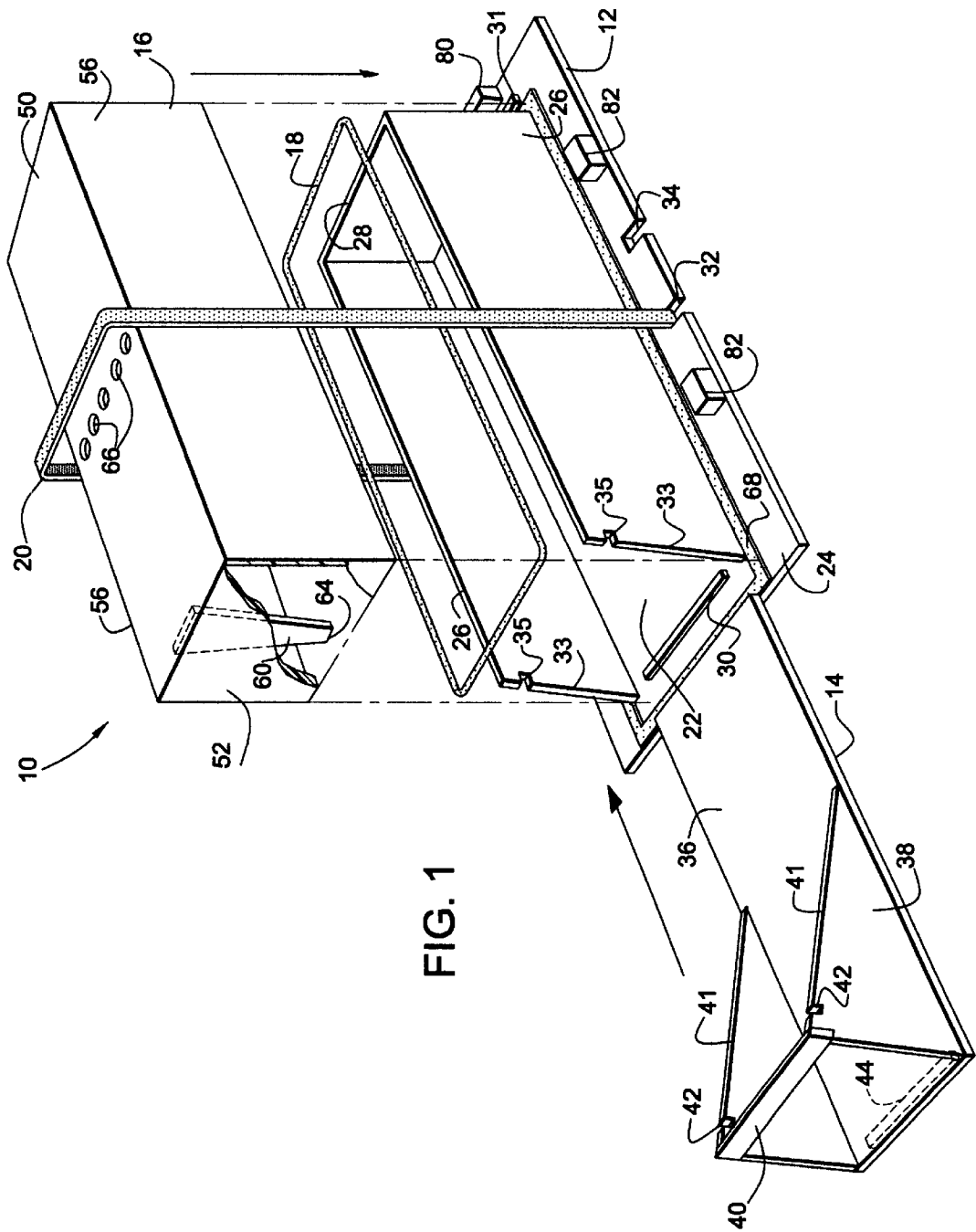
FIG. 1 is an exploded perspective view of an individual rodent trapping device of the present invention.

In the present invention, as pictured in FIGS. 1–9, a rodent trap is designated generally by reference numeral 10.

Figure 2:
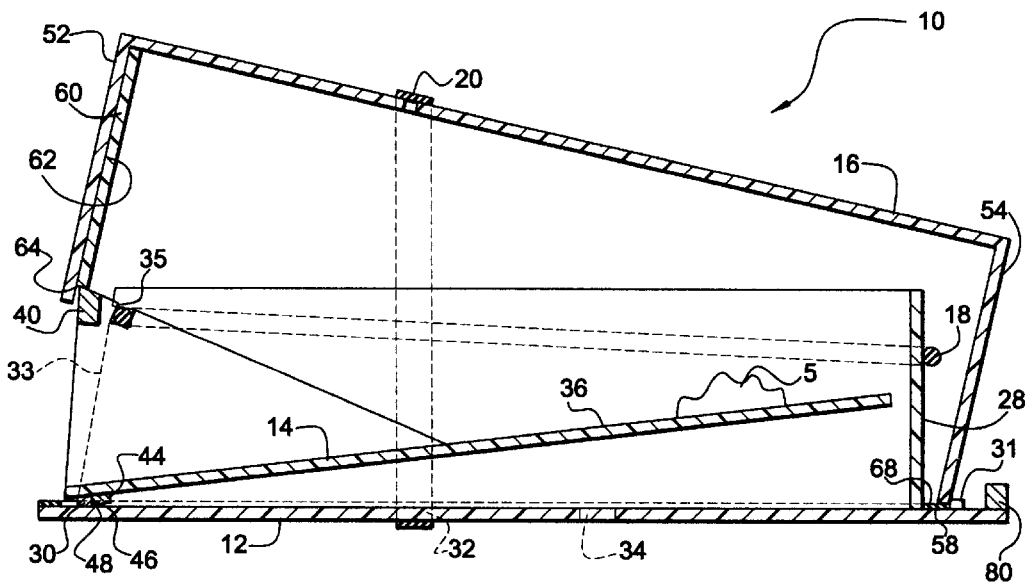
FIG. 2 is a longitudinal sectional view schematically depicting a rodent trapping in an open position of FIG. 1.
Figure 3:
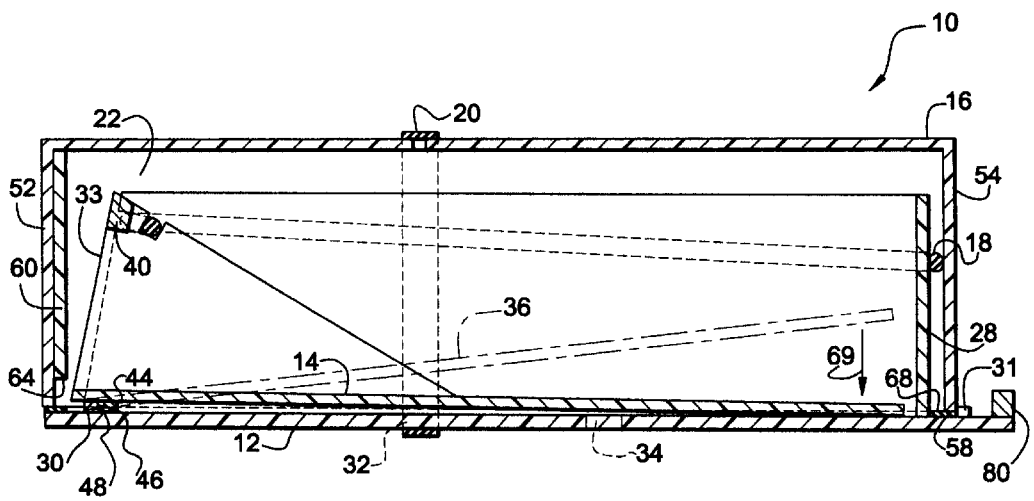
FIG. 3 is a longitudinal sectional view schematically depicting the rodent trapping device of FIG. 1 in a closed or tripped position.

In sum, the rodent trap 10 includes a base 12, a trigger 14, a lid 16, a trigger biasing device 18 biasing the trigger 14 with respect to the base 12, and a lid biasing device 20 biasing the lid 16 with respect to the base 12. The base 12 and the lid 16 have walls that together define an enclosure 22 for entrapping a rodent. In sum, the lid 16 and trigger 14 are movable with respect to the base 12 to permit the enclosure 22 to move from an open or set position, as shown in FIG. 2, and a closed position, as shown in FIG. 3. When the trap 10 is set and a rodent enters the enclosure 22, the rodent's weight causes the trigger 14 to move against its biasing device 18. This releases the lid 16, which was held in place by the trigger 14, and the lid 16 automatically closes due to its biasing device 20. This entraps the rodent within the enclosure 22. Other details and features of the trap are described below.

The base 12 includes a bottom portion or floor 24, opposing left and right side walls 26, and a rear wall 28 extending vertically upward from the floor 24. The side walls 26 and rear wall 28 form the sides and rear of the enclosure 22, while the floor 24 between the side walls 26 forms the bottom of the enclosure 22. A trigger retaining bar or member 30 extends upwardly from the floor 24 near the front of the side walls 26 for interfacing with the trigger 14. A lid retaining member 31 extends upwardly from the floor 24 behind the rear wall 28 for interfacing with the lid 16. The floor 24 also includes grooves 32 and 34 that are positioned to hold the lid biasing device 20 in a selected position that defines whether the trap will be used in a rodent suffocation mode or in a rodent release mode. The opposing side walls 26 each have a forward edge 33 that is rearwardly tapered to provide clearance for the lid 16. The forward edge 33 of each side wall 26 also has grooves 35 therein that retain the trigger biasing device 18 with respect to the base 12 so it can control the biasing of the trigger 14 with respect to the base 12.

The trigger 14 resides within the walls 26 and 28 of the base 12 and moves in a generally pivotal manner about trigger retaining bar 30. Trigger 14 includes a platform or floor 36, a lid holding member or cross bar 40, and side supports 38 joining the lid holding member to the floor 36. Each side support 38 includes a angled upper edge 41 with a groove 42 therein towards its forward end for holding the trigger biasing device 18. A fulcrum bar 44 is preferably attached to the underside of the floor 36 adjacent its forward end to interface with the trigger retaining bar 30 on the base 12. The front edge 46 of fulcrum bar 44 abuts against the rearward end 48 of trigger retaining member 30 and the underside of the floor 36 forward of the fulcrum bar 44 abuts the top of the trigger retaining member 30 in a manner that permits pivotal movement of the trigger 14 about the trigger retaining member 30. It is noted that while the trigger retaining member 30 and the fulcrum bar 44 are rectangular in cross section, they could be shaped to be complementary and convex and concave to enhance the smoothness of the rotational movement and provide pure pivotal movement. While the trigger 14 rotates, it is freefloating and held in place by the trigger biasing device 18 without the need for pins or rotatable axis.

Figure 4:
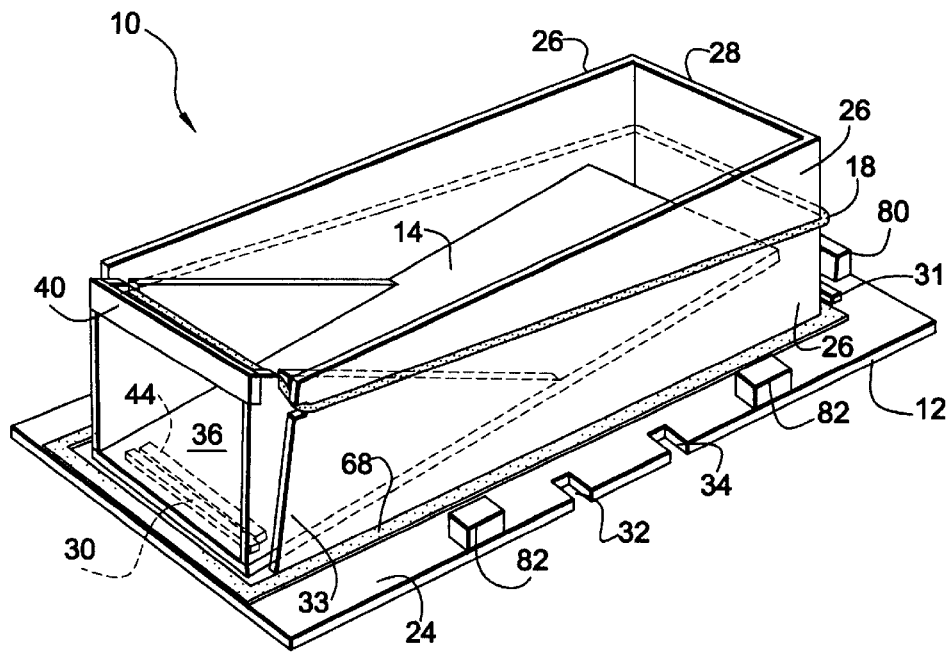
FIG. 4 is a perspective view of the base rodent trapping device of FIG. 1.

The trigger biasing device 18 biases the trigger 14 toward a set position, preferably with the floor 36 of the trigger 14 angularly displaced from the floor 24 of the base 12 by 5°–10°. In a preferred embodiment, as best shown in FIG. 4, the trigger biasing device 18 is an elastic band that extends around the outside of the rear wall 28 and left and right side walls 26 of the base 12. The forward portion of the elastic band 18 is placed in the grooves 35 of the left and right side walls 26 and spans the region between the side walls 26. The elastic band 18 is also routed through grooves 42 in the vertical side supports 38 of the trigger 14. The elastic band 18 will be biased to move into a straight position between the left and right side walls 26. However, the grooves 42 in the vertical side supports 38 would normally be displaced rearwardly behind grooves 35 in the side walls 26. Therefore, the elastic band 18 provides a biasing force to move the trigger 14 forwardly. More specifically, the elastic band 18 provides a biasing force to move the fulcrum bar 44 and bottom front portion of the platform 36 of trigger 14 into the trigger retaining member 30, which in turn, causes the trigger to be biased in a counter-clockwise direction as viewed from FIGS. 3 and 4. This extends the cross bar 40 forward of the side walls 26 so it can engage the lid 16.

The lid 16 fits over the walls 26 and 28 of the base 12 and forms the top and front portions of the enclosure 22. The lid 16 includes a top wall 50, a front wall 52, a rear wall 54, and right and left opposing side walls 56. As shown in FIGS. 2 and 3, the bottom edge 58 of the rear wall 54 of the lid 16 is retained between the rear wall 28 of the base 12 and the lid retaining member 31 in a manner that permits quasi-pivotal movement of the lid 16.

That is, the lid 16 moves between the positions shown in FIGS. 2 and 3, except such movement is not caused by a pin or axle. The bottom edge 58 of rear wall 54 can translationally move a small amount within the gap between the rear wall 28 and lid retaining member 31 in addition to pivoting. A lip 60 is located on the inside surface 62 of the front wall 52. As shown in FIG. 2, the bottom surface 64 of the lip 60 and the bottom portion of the inside surface 62 of front wall 52 engage the top and front portions of the cross bar 40 to retain the trigger 14 in a set position. The top wall 50 includes one or more holes or openings 66 positioned transversely across the lid 16. The position of the lid biasing device 20 with respect to the holes 66 determines whether the trap 10 is being used in a suffocation mode or in a rodent release mode.

The lid biasing device 20 biases the lid 16 towards its closed position, i.e., it biases the lid 16 downwardly to close it so that the bottom edge of the lid 16 is forced against the top of the floor 24. In a preferred embodiment, the lid biasing device is an elastic band 20 that encircles the trap 10 extending around the top and side walls 50 and 56 of the lid 16, below the floor 24 of the base 12, and is positioned within one of the two pairs of grooves 32 or 34 in the floor 24.

When the elastic band 20 is placed in the pair of front grooves 32, its upper portion covers a row of holes 66 in the top wall 50 of the lid 16. This places the rodent trap 10 in a rodent suffocation mode. When the lid biasing device 18 is placed in the pair of rear grooves 34, the row of holes 66 in the top wall 50 of the lid 16 is exposed permitting air to pass into the enclosure through the holes 66. This places the rodent trap 10 in a rodent release mode. When the trap 10 has been tripped and the trap 10 is in the rodent release mode, the rodent can continue to obtain a supply of air through holes 66. The rodent will remain in the tripped trap 10 until the lid 16 is opened. When the trap 10 has been tripped and the trap 10 is in the rodent suffocation mode, it is substantially airtight and a rodent trapped inside will suffocate when its supply of oxygen has been depleted. To further ensure that the enclosure is air tight when the trap 10 has been tripped, a gasket 68, such as shown in FIG. 4, may be used on the floor 24 where the bottom surface of the lid 16 contacts it. Gasket 68 may be made from any material, e.g., compressible rubber, silicone, clay, etc., that enhances the seal between the lid 16 and the base 12. The gasket 68 may be attached to either the top of the floor 24 or the bottom edge of the lid 16.

In operation, assuming that the trap 10 is in its desired mode, bait 5 is placed towards the rear end of platform 24 and the trap 10 is set. If desired, the trap 10 may be sold pre-baited, or if not, the bait 5 may be inserted into the trap 10 by depositing the bait 5 into the opening between the sidewalls 26. To set the trap, the front end of the lid 16 is lifted so that the lid 16 tilts about the rear edge 58 of rear wall 54. The lifting of the lid 16 is performed against the biasing force applied by lid biasing device 20. As the lid 16 is being lifted, the trigger biasing device 18 pushes the trigger 14 forwards so it tilts about trigger retaining member 30 in a direction counter-clockwise as viewed from the side elevation of FIG. 2. The lid 16 is raised until the bottom of the lip member 64 is above and in contact with cross bar 40 and the trap 10 is thereby set. In this set position, the lid biasing member 20 is biasing the lid 16 downward. However, it is held in place because the cross bar 40 prevents downward movement of the lid 16. Simultaneously, the cross bar 40 is biased forward and outward against the inside surface 62 of the front wall 52 of the lid 16. The trigger 14 is also held in place by the lid 16 because the lid biasing device 20 prevents the lid 16 from moving upward and the rear wall 54 of the lid 16 is against the rear wall 28 of the base 12.

If a rodent enters the front 11 of the trap 10 to eat the bait 5, the weight of the rodent will provide a downward force at the rear end of the trigger 18 that produces a clockwise force on the trigger 18 about the trigger retaining member 30 in the direction of arrow 69. This force is in excess of the trigger biasing force and the trigger will move clockwise as shown in FIG. 3. Rotational displacement of the trigger 14 in a clockwise direction by a minimal amount causes the cross bar 40 to move inward and disengage from the lip member 62. This removes the resistance to the force applied by the lid biasing device 20. Accordingly, lid biasing device 20 rapidly closes the lid 16 against the floor 24. If the lid biasing device 20 is routed through the front grooves 32, the lid biasing device 20 covers the holes 66 and the enclosure of the trap is substantially airtight and the rodent trapped inside will suffocate when its supply of oxygen has been depleted. If the lid biasing device 20 is in the rear grooves 34, the unobstructed holes 66 permit air to enter the enclosure and the rodent can continue to obtain a supply of air through holes 66. A trapped rodent may be released by lifting the lid 16 in the same manner the trap 10 is set. Changing the modes can be accomplished by moving the elastic band 20 from one set of grooves to the other.

Figure 5:
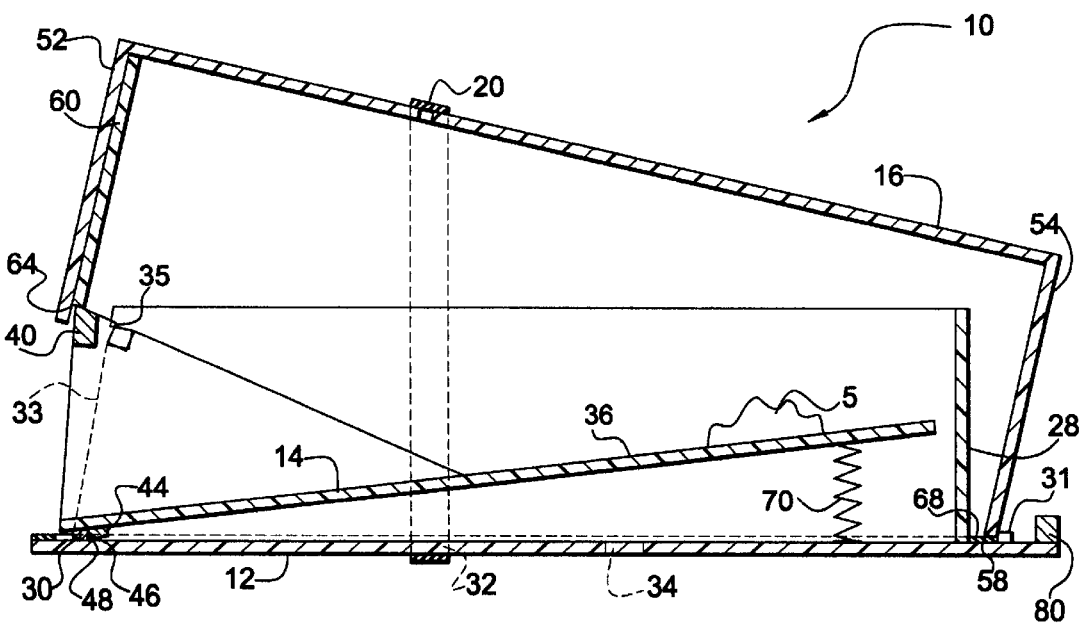
FIG. 5 is a longitudinal sectional view schematically depicting a rodent trapping in an open position having an alternate trigger biasing device.

In lieu of the elastic band serving as the trigger biasing device 18, a coil spring 70, as shown in FIG. 5, may be placed between the bottom of the platform 36 adjacent its rear end and the floor 24. The spring 70 may be mounted to either the bottom of the platform 36 or the floor 24. This spring 70 serves the same purpose as the elastic band, i.e., to bias the trigger 14 counter-clockwise to extend the cross bar 40 forwardly. Alternatives for the elastic band or the coil spring 70 include other springs, e.g., a leaf spring, and other devices that provide a repulsion force between the bottom of the platform 36 and the floor 24. For example, a sponge or compressible foam material may be placed between the bottom of the platform 36 and the floor 24 to provide the desired trigger biasing force. Alternatively, magnets may be placed on the underside of the platform 36 and the floor 24 and oriented so that similar poles of the magnets face each other to provide a repulsive force to bias the trigger 14.

On advantage obtained by this arrangement is that it can be inexpensively manufactured and assembled. The two movable portions that move in a generally pivotal manner, the lid 16 and the trigger 18, and the parts interfacing therewith, do not have small rods or projections that can easily break or can be difficult to manufacture or assemble. Further, the lid 16 and the trigger 18 do not need rotational pins or the like because they are also laterally guided by the outside and inside of the side walls 26 of the base 12, respectively.

Figure 6:
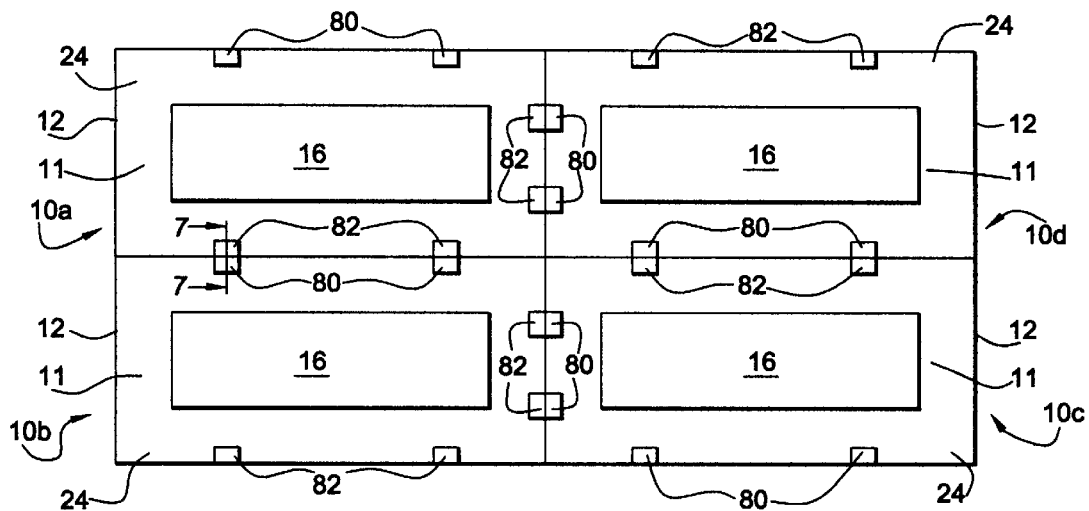
FIG. 6 is a top plan view schematically depicting a rodent trap including a plurality of individual rodent traps joined in side-to-side and end-to-end configurations.

The rodent trap 10 also includes a rodent trap joining system for removably joining individual rodent traps 10 together to assemble a larger rodent trap comprised of individual traps 10 having a desired configuration. As depicted in FIG. 6, the rodent trap joining system permits the individual traps, e.g., traps 10a–10d, to be removably joined in a side-to-side configuration and/or in a back-to-back configuration. For clarity and simplicity, many details of the traps 10a–10d have been omitted in FIG. 6.

The preferred arrangement for accomplishing this feature is by using paired mating elements 80 and 82 that mate and interlock such that when mated, they will resist separation and remain coupled together until a force that exceeds a predetermined amount is applied to separate the elements. The mating elements 80 and 82 are complementary to each other such that element 80 mates and interlocks with element 82. These mating elements 80 and 82 are positioned such that any two traps can be positioned and attached side-by-side or end-to-end. While the traps 10 are depicted as having two mating elements 80 and 82 on each lateral side and at their rear end, it is recognized that one or more than two mating elements could be used. Thus, the joined traps 10a–10d will remain in their joined configuration, and will be movable as a unit, e.g., a large rodent trapping device having four smaller rodent traps 10, unless a predetermined force is applied to remove one or more traps 10a–10d from the group of joined individual traps. One half of at least one pair of mating elements 80 and 82 is positioned adjacent the periphery of the floor 24 along each side of the trap 10 and on the rear of the trap 10. Each is preferably positioned on each side of the floor 24 of the base 12.

Figure 7:
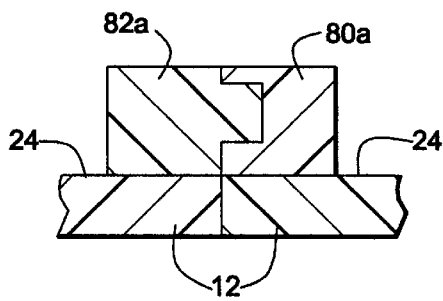
FIG. 7 is a cross-section taken through line 7—7 of FIG. 6 showing the trap interconnecting members.
Figure 8:
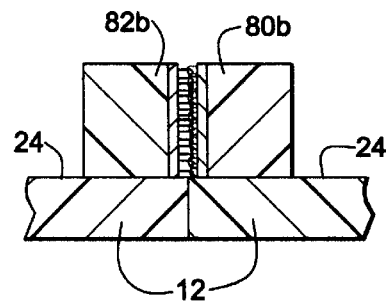
FIG. 8 is view similar to FIG. 7 showing an alternative embodiment of interconnecting members.
Figure 9:
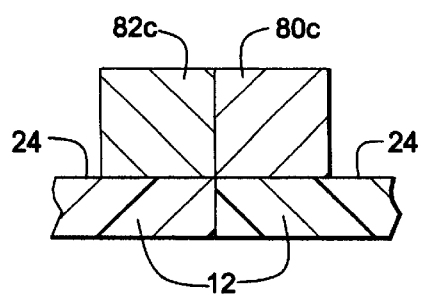
FIG. 9 is view similar to FIGS. 7 and 8 showing another alternative embodiment of interconnecting members.

As shown in FIG. 7, the first and second interlocking elements 80a and 82a are of the press-fit variety wherein one element 82a is of male-type and the other 80a is of the female-type. The male element 82a is press fit into the female element 80a to provide a friction fit. These elements can be similar to the LEGO™ building blocks. Alternatively, as shown in FIG. 8, a hook and loop type mating system, e.g., VELCRO™, can be used where one element 82b has a number of hook-type members and the other 80b has a number of the loop-type members. In another embodiment, as shown in FIG. 9, both elements 80c and 82c are magnets oriented with opposite poles facing each other. This provides an attraction force to couple the members 80c and 82c together. In lieu of, or in addition to the above-described coupling systems, other arrangements could be used, e.g., interlocking edges, or aligned bore holes with a separate rod for insertion into the holes.

The base 12, trigger 14, and lid 16 are preferably made from any suitable plastic and may be formed by injection molding or any other suitable process. However, these elements can also be made from metal or fiberboard. Additionally, the trap 10 is designed such that it can be reused or discarded. Furthermore, while the trap 10 has been described for use for catching rodents, it could be scaled to be larger or smaller for catching other animals.

While particular embodiments of the invention have been shown and described, it is recognized that various modifications thereof will occur to those skilled in the art. For example, the preferred embodiment of the lid biasing device 20 is an elastic band due to its simplicity, cost, ease of installation, and flexibilty to be moved to change the mode of the trap. However, it is recognized that alternatives to the elastic band, e.g., a spring clip, a rearwardly mounted spring hinge, a "C"-shaped spring, etc., may be used making necessary modifications to the trap 10. Therefore, the scope of the herein-described invention shall be limited solely by the claims appended hereto.

What is claimed is:

1. A rodent trapping device comprising:

an enclosure including a first member and a second member, and having an interior and an exterior, the second member being movable relative to the first member so that the enclosure can be in one of an open condition for permitting access into the interior of the enclosure by a rodent and a closed condition for retaining a rodent trapped within the interior of the enclosure;

at least one air hole located in said enclosure;

a biasing device for biasing said second member relative to the first member to urge the enclosure into the closed condition, said biasing device being selectively positionable with respect to the enclosure between a first position placing said rodent trapping device in a rodent suffocating mode and a second position placing said rodent trapping device in a non-suffocating mode;

a triggering device, said triggering device detecting the presence of a rodent within the interior of the enclosure so that said enclosure is moved from the open condition to the closed condition in response to the detection of a rodent by the triggering device;

wherein said biasing device covers said at least one air hole to suffocate an entrapped rodent when the enclosure is moved into the closed condition and said trapping device is in a rodent suffocating mode, and wherein said at least one air hole is unobstructed by said biasing device to permit an entrapped rodent to breathe when the enclosure is moved into the closed condition and said trapping device is in a rodent non-suffocating mode.

2. The rodent trapping device of claim 1, further comprising first and second retaining elements in said first member, wherein said first retaining element holds said biasing device in said first position and said second retaining element holds said biasing device in said second position.

3. The rodent trapping device of claim 1, wherein said biasing device is an elastic band.

4. The rodent trapping device of claim 3, wherein said elastic band fully encircles said enclosure.

5. The rodent trapping device of claim 4, wherein said first member is a base having opposing side walls and a rear wall, and said second member is a lid.

6. The rodent trapping device of claim 5, further comprising a gasket disposed between surfaces of the base and lid.

7. The rodent trapping device of claim 5, wherein the opposing side walls of the base guide the movement of the lid.

8. The rodent trapping device of claim 1, wherein said first member moves with respect to the second member in a quasi-pivotal manner.

9. The rodent trapping device of claim 1, wherein said rodent trapping device includes locking members permitting the rodent trapping device to be removably engageable with other rodent trapping devices.

10. The rodent trapping device of claim 1, wherein said rodent trapping device includes means for removably attaching the rodent trapping device to other rodent trapping devices.

11. The rodent trapping device of claim 1, further comprising means for biasing the triggering device.

* * * * *